Dec. 6, 1938.  D. W. SESSIONS  2,139,473
HYDRAULIC JACKING SYSTEM FOR VEHICLES
Filed Nov. 19, 1935  4 Sheets-Sheet 1
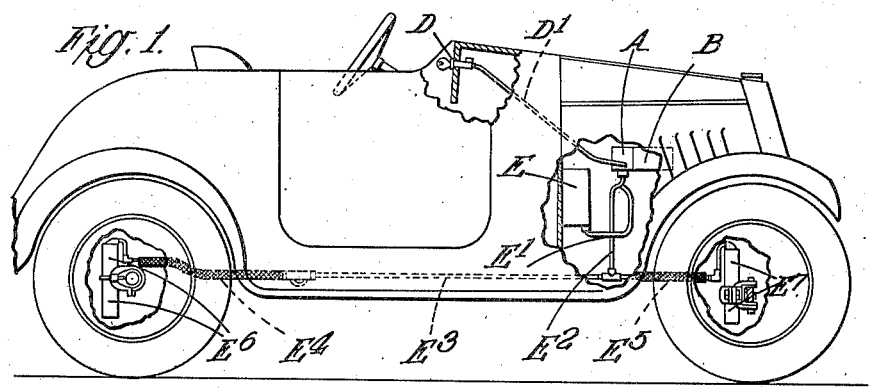
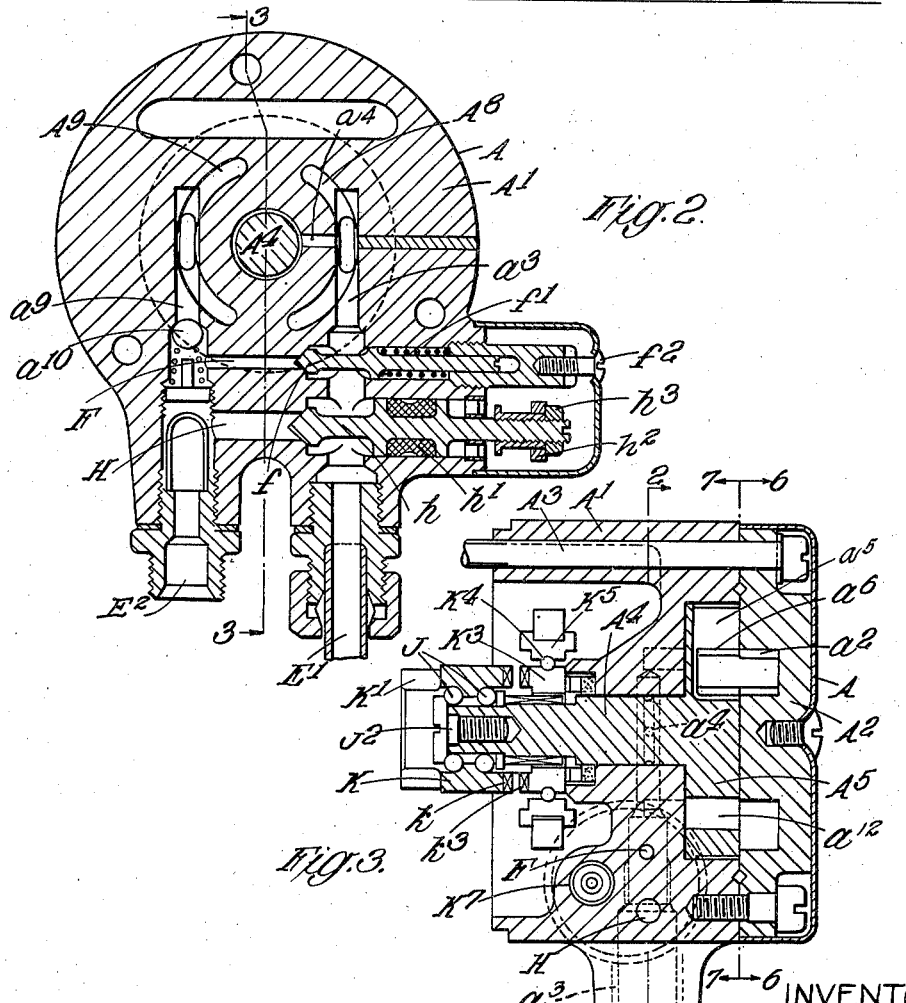
INVENTOR:
DONALD WILFRED SESSIONS
BY Haseltine, Lake & Co.
ATTORNEYS

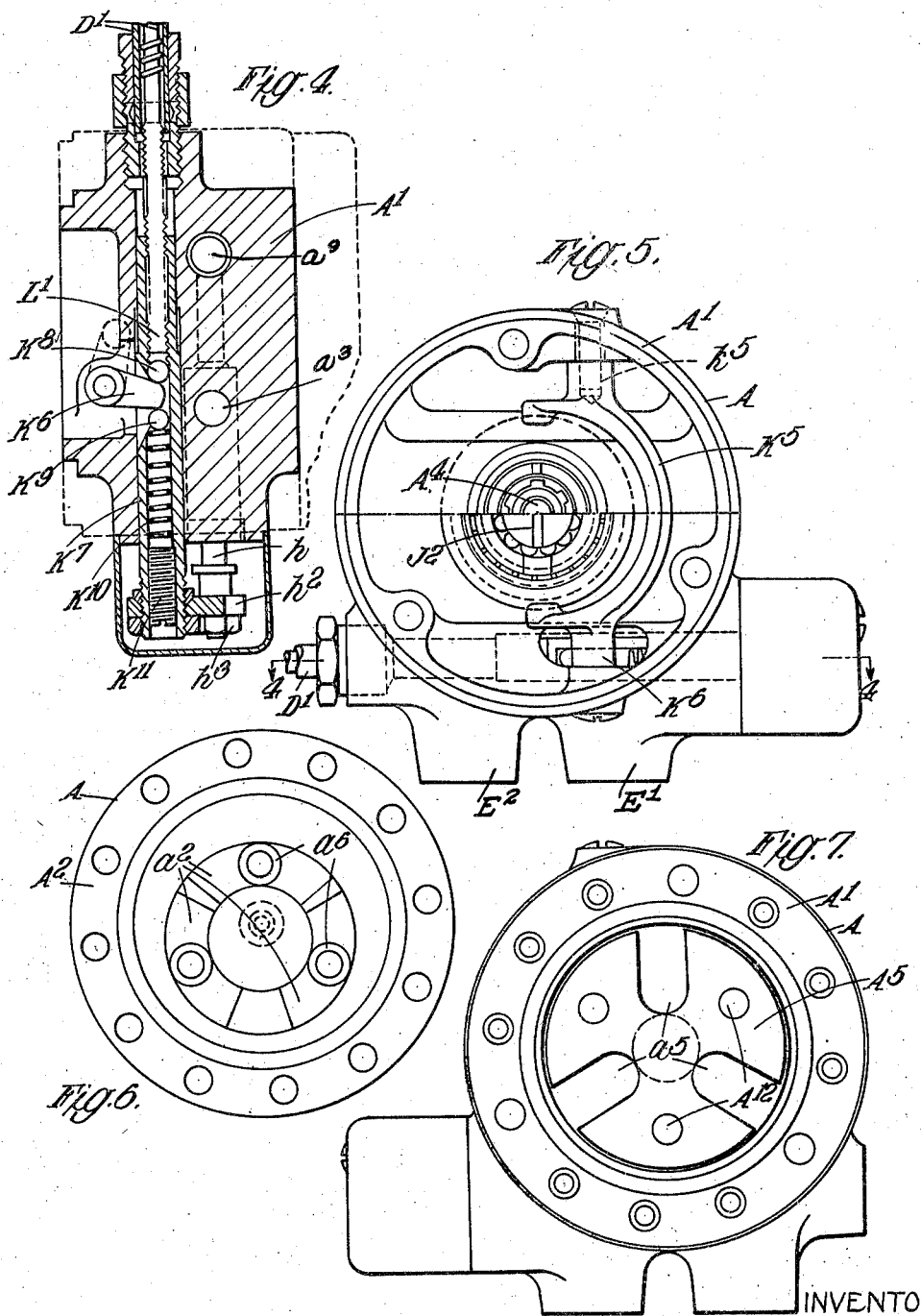

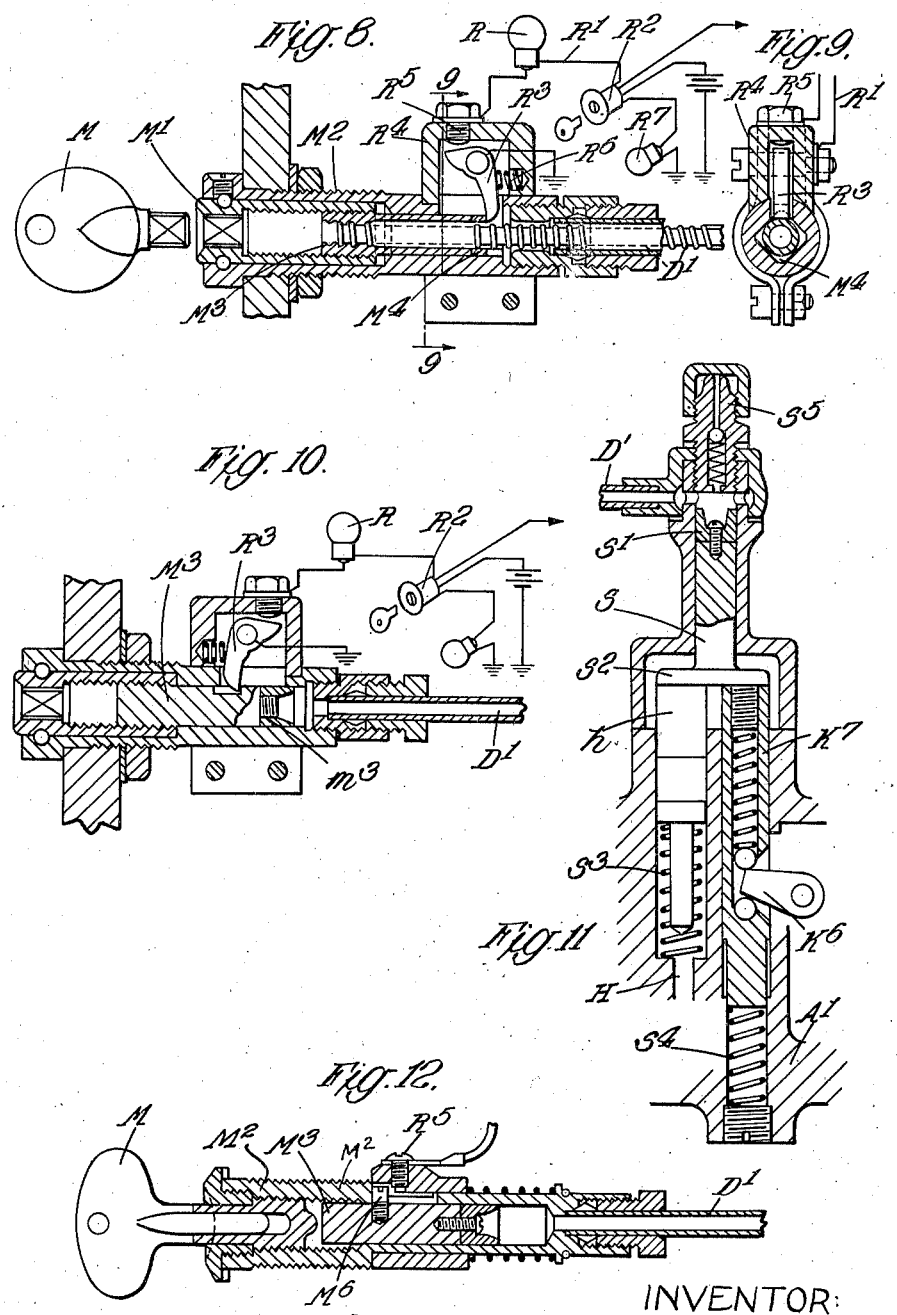

Dec. 6, 1938. D. W. SESSIONS 2,139,473
HYDRAULIC JACKING SYSTEM FOR VEHICLES
Filed Nov. 19, 1935 4 Sheets-Sheet 4
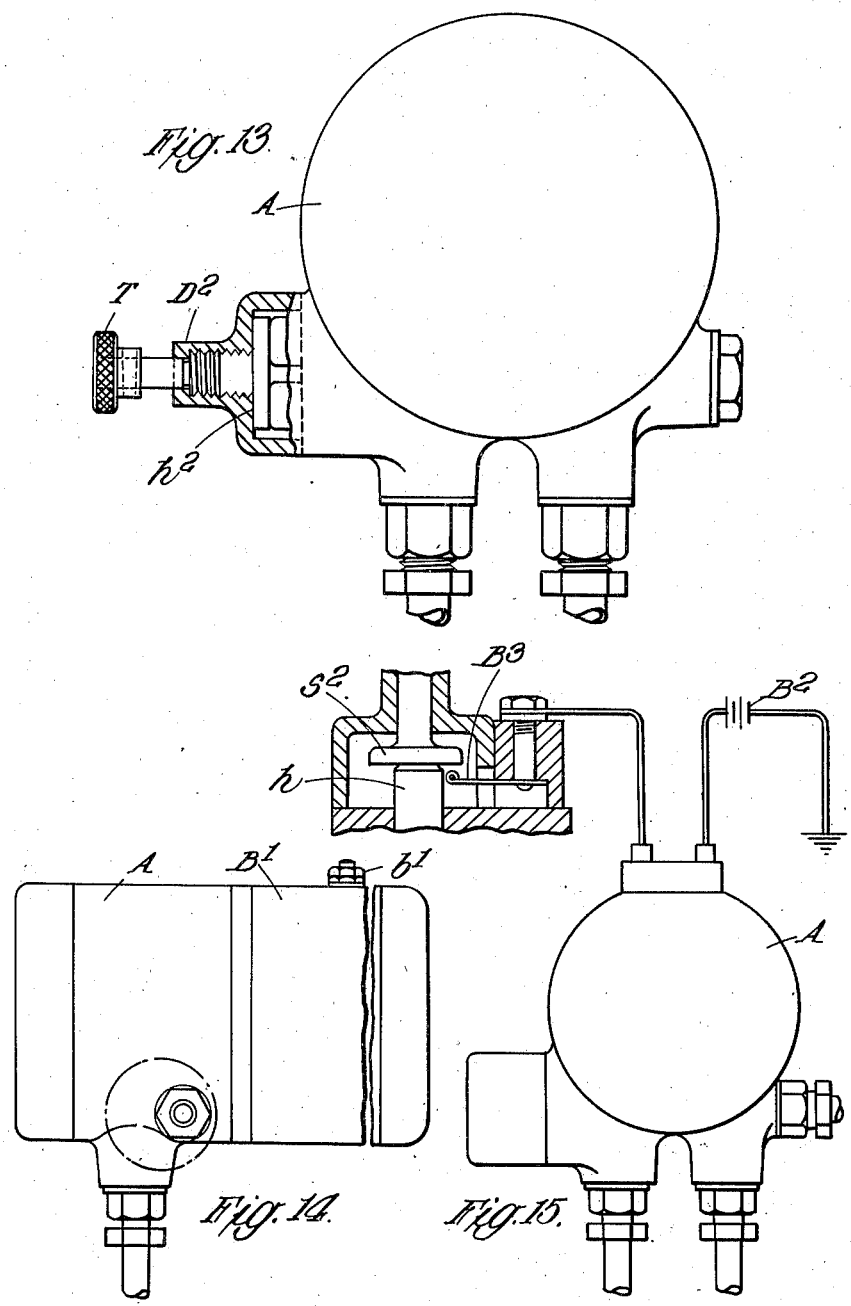
INVENTOR:
DONALD WILFRED SESSIONS
BY Haseltine, Lake & Co.
ATTORNEYS Patented Dec. 6, 1938

2,139,473

UNITED STATES PATENT OFFICE 2,139,473

HYDRAULIC JACKING SYSTEM FOR VEHICLES

Donald Wilfred Sessions, Willesden, London, England

Application November 19, 1935, Serial No. 50,531
In Great Britain October 16, 1935

3 Claims. (Cl. 60—52)

This invention relates to hydraulic jacking systems for vehicles of the kind in which a pump delivers high pressure fluid which is utilized for operating lifting jacks permanently attached to the vehicle.

According to an important feature of the invention an "annular piston" type of pump of the kind described in the specification of Patent No. 1,997,233 can be coupled to the engine or other driving part directly or by means of a clutch actuated by a key or other control member adapted to be actuated by the driver.

According to a further important feature of the invention the pump, which is preferably although not essentially of the annular piston type, is associated with such a clutch and also with a release valve which controls release of pressure fluid from the jack cylinders to exhaust or oil reservoirs, and the clutch and release valves are connected to a common control member whereby operation of the control member brings about the desired operation, both of the clutch and of the valve.

The pump may be designed for attachment to the back of a dynamo or dynamo drive and may be designed to form a continuation of the dynamo casing. Alternatively, the pump may be coupled to the usual drive of the fan, water pump, ignition distributor, engine oil pump, revolution counter or to the cam shaft, crank shaft, or other suitable part, or to a specially provided electric motor driven for example from the vehicle batteries and may be coupled directly or by means of a belt, chain, shaft, flexible shaft, or other drive.

In order that the invention may be clearly understood and readily carried into effect the same will now be described more fully with reference to the accompanying drawings in which:—

Figure 1 is a diagrammatic illustration of a motor car having applied thereto a jacking system in accordance with the invention;

Figure 2 is a sectional view of the pump on the lines 2—2 of Figure 3;

Figure 3 is a sectional view of the pump on the line 3—3 of Figure 2;

Figure 4 is a sectional view on the line 4—4 of Figure 5 of part of the pump control devices;

Figure 5 is an end elevational view of the pump with the clutch devices removed from the upper half;

Figure 6 is a sectional view of the pump on the line 6—6 of Figure 3;

Figure 7 is a sectional view of the pump on the line 7—7 of Figure 3;

Figure 8 is a sectional view of the part of the pump control devices which are situated adjacent to the dashboard;

Figure 9 is a sectional view on the line 9—9 of Figure 8;

Figure 10 is a sectional view similar to Figure 8, but showing a modified arrangement;

Figure 11 is a sectional view similar to Figure 4 but illustrating a modified arrangement adapted for use with the arrangement of Figure 10;

Figure 12 is a view similar to Figure 10 but showing a further modification;

Figure 13 illustrates a pump having the control device mounted on it adjacent thereto;

Figures 14 and 15 are side and end elevational views respectively of the pump attached to an electric motor for driving the pump.

The pump A is mounted on the vehicle in a suitable position according to the part from which it is to be driven. In Figure 1 the pump A is shown attached to a dynamo B to which it can be coupled, and in Figures 14 and 15 it is shown attached to an electric motor $B^1$ operated from the vehicle batteries $B^2$. The driving and stopping of the pump is effected through a control on the dashboard indicated generally at D which is connected by a low pressure device $D^1$ such as a pipe or cable (but preferably not a high pressure fluid line) to the pump, or by a control $D^2$ (Figure 13) mounted on the pump adjacent thereto. The pump draws oil from a reservoir E through a pipe $E^1$ and forces the oil through a discharge pipe $E^2$ into a horizontal pipe line $E^3$ and flexible tubes $E^4$, $E^5$, to a pair of hydraulically operated jacks $E^6$ permanently attached to the rear axle and to a pair of hydraulically operated jacks $E^7$ permanently attached to the front axle. The lifting jacks and means for attaching them permanently to the vehicle may be as disclosed in the specification of my Patent Number 2,065,030. The pump comprises a main casting or body $A^1$ and a cap $A^2$ held on to the body by bolts $A^3$ some of which bolts also serve for attaching the pump to the dynamo, electric motor, or other appropriate part. Mounted about centrally in the pump body $A^1$ is a pump spindle $A^4$ carrying a rotor $A^5$ in which three radial slots $a^5$ are formed. The cap $A^2$ has an annular recess therein located eccentrically with respect to the axis of the spindle $A^4$. The annular pistons comprise three piston blocks $a^2$ located in said recess and carrying rollers $a^6$ that are engaged in the radial slots $a^5$. When the spindle $A^4$ is rotated the piston blocks $a^2$ rotate and move apart and together alternately and draw oil into the spaces between them from the inlet port $A^8$ and expel this oil to the outlet port $A^9$ in the pump body $A^1$. The inlet port $A^8$ communicates through an inlet passage $a^3$ with the pipe $E^1$ and the outlet port $A^9$ communicates through a delivery passage $a^9$ with the pipe $E^2$. In the pump body are two conduits F, H, parallel with each other and perpendicular to the passage $a^3$, $a^9$ and establishing communication between said latter passages. The outlet passage $a^9$ contains a non-return ball valve $a^{10}$. The passage F is a safety passage controlled by a safety valve $f$ normally held on its seating by a spring $f^1$, the pressure of which is adjustable by adjusting the screw $f^2$. The passage H is a release passage controlled by a valve member $h$ for releasing the fluid pressure supplied to the jacks. The release valve member is situated transversely across the inlet passage $a^3$ and only requires an air lock ring comprising a rubber ring $h^1$ in an annular grove instead of a pressure gland. Oil leaking along the spindle $A^4$ is drawn off through apertures $a^4$ into the inlet passage $a^3$. The passages $a^3$, $a^9$, are on the same side of the rotor $A^4$ this being possible by reason of apertures $A^{12}$ through the rotor through which oil passes from the port $A^8$ to the piston blocks and thence back through these apertures to the port $A^9$.

The clutch for coupling to the dynamo drive, electric motor armature or other driving part is mounted on the pump spindle $A^4$. The spindle $A^4$ has mounted on its end two ball races J on which a rotatable clutch collar K is mounted. This collar is slotted at $K^1$ or otherwise suitably formed to be connected permanently to the driving member and has clutch teeth $k$. The ball races J and the collar K are normally held on the spindle by the head of a screw $J^2$ which is screwed into the end of the spindle $A^4$. Splined on to the spindle between the collar K and the pump body is a slidable annulus $K^3$ having clutch teeth $k^3$ and movable axially of the spindle to bring its teeth into and out of engagement with the teeth on the collar K. Each of the teeth is preferably in the form of a truncated cone. The annulus is mounted in ball bearings $K^4$ in the yoke $K^5$ of a clutch operating gear, which yoke is mounted on trunnion pins $k^5$ in the pump body $A^1$. The yoke has an integral arm $K^6$ (Figures 4 and 5) which extends into the interior of a tube $K^7$ through a slot in the wall of the tube. The extremity of this arm is engaged on opposite sides by two steel balls $K^8$, $K^9$, the steel ball $K^9$ being loaded by a spring $K^{10}$ which is adjustable for compression by a grub screw $K^{11}$ in the tube. The tube is slidable in the pump body $A^1$ and is connected to the interior movable part of the push-and-pull cable $D^1$. Operation of this cable actuates the arm $K^6$ and the yoke $K^5$ to engage or disengage the clutch. If at any time the clutch is overloaded the spring loaded ball $K^9$ will yield to enable the clutch to move out of engagement. Operation of the release valve is effected by the same actuation of the cable $D^1$. For this purpose the release valve member $h$ is connected to the tube $K^7$ by a link $h^2$ held in position by a nut $h^3$. The spring loaded ball $K^9$ is on the same side of the arm $K^6$ as the valve member and the push-pull cable is on the opposite side.

For actuating the cable $D^1$ it is connected to the device D mounted on the dashboard of the vehicle. The driver fits a detachable key M in a socket $M^1$ mounted on the dashboard and rotates the socket. This socket is rotatably mounted by a ball bearing in an outer barrel $M^2$ which is connected at its rear end to the outer tube of the cable $D^1$. The socket is internally screw-threaded to receive a thread member $M^3$ which can move axially but is held against rotation by a square head $M^4$. This movable member is connected to the inner movable part of the push-and-pull cable $D^1$.

For giving a warning to the driver an electric lamp R is arranged on the dashboard of the vehicle or in some other position readily observable by the driver and means are provided for supplying electric current to the lamp including an electric circuit $R^1$ and a device whereby the circuit is broken when the jacking system is out of use and made when the system is in use so that the lamp will then be on to give adequate warning to the driver. The said circuit also is arranged to be broken and made by actuation of the usual engine switch $R^2$ so that the lamp will not be left "on" inadvertently after the engine switch has been turned off. The device referred to comprises a two-armed lever $R^3$ pivotally mounted in a small housing $R^4$ on the barrel $M^2$, and one arm of this lever extends through a slot or slots into the path of the square head $M^4$. The other arm forms or carries an electric contact member adapted to make contact with another contact member $R^5$ carried by the housing $R^4$. A spring $R^6$ is provided between the first arm and the said housing which tends to move the lever to bring the two contacts together. For operating the lifting jacks the engine switch will be "on" and the key will be rotated in the appropriate direction to move the movable member by reason of the screw-threaded engagement in the direction to couple the pump through the clutch to the driving member. This movement of the movable member releases the two-armed lever $R^3$ and the two contacts come together and the electric circuit through the lamp is thus completed. The electric circuit will be broken either by turning the engine switch off or by rotating the key M sufficiently in the opposite direction to uncouple the pump from the said driving member. If for instance the jacks are left extended and the vehicle is left overnight, the engine switch will be "off" and the lamp will therefore not be using the vehicle batteries, but when the engine switch is turned on the lamp circuit will be completed and will warn the driver that the jacks are extended. The switch $R^2$ also controls the usual ignition indicator lamp $R^7$.

Instead of employing a push-and-pull cable $D^1$ this device may be in the form of a tube containing a column of fluid as shown in Figures 10, 11, and 12. The tube $D^1$ contains a column of liquid and the movable member $M^3$ is in the form of a piston having a rubber washer $m^3$ attached to it. The other end of the tube $D^1$ is connected to the pump body $A^1$ as shown in Figure 11 and the column of liquid acts upon a piston S which is provided with a rubber washer $S^1$. The piston S is fixed to a cross-bar $S^2$ which actuates the tube $K^7$ and valve member $h$ as described with reference to Figure 4. Allowance should of course be made in the spacing of the clutch members or otherwise for expansion of the column of fluid. In the modification shown in Figure 12 the key M has a screw-threaded engagement with the barrel $M^2$ so that rotation of the key causes the key to move along the barrel and push the piston $M^3$ along the cylinder comprising part of the barrel. The piston $M^3$ carries a small projection or terminal $M^6$ which passes through a slot in the barrel and moves into and out of engagement with a screw $R^5$ on the housing $R^4$, this screw being connected in the circuit of the lamp R. Return springs $S^3$ and $S^4$ operate respectively on the parts $h$ and $K^7$ to return these parts and the column of liquid to the normal positions. A valve controlled nozzle $S^5$ facilitates initial introduction of the column of liquid.

In the modification shown in Figure 13 the dashboard control is omitted and the part $h^2$ of Figure 4 or $S^2$ of Figure 11 is operated by a screw T mounted on the pump body. The part $h^2$ or $S^2$ controls a switch $B^3$ instead of a clutch.

In the arrangement shown in Figures 14 and 15 the electric motor $B^1$ has its terminals $b^1$ supplied with current from the battery $B^2$ and the pump A fits the motor and is attached thereto, the pump body having a substantially continuous appearance with respect to the motor casing. With this arrangement the clutch $K^1$, $K^3$, etc., is omitted and a switch substituted therefor in the motor circuit, this switch being controlled by the movement of the tube $K^7$.

It will be observed that the jacking system is so constructed and arranged that in any "on" position of the control means the jacks will be operated simultaneously to raise all of the wheels of the vehicle off the ground. By this arrangement the disadvantage heretofore experienced of a driver setting the vehicle in motion whilst the front jacks are extended is obviated. The further disadvantage of jacking with only one or two jacks on a steep incline thus putting considerable bending strain on the jacks is also obviated. Also the invention avoids bringing a pressure fluid pipe line up to the dashboard.

What I claim and desire to secure by Letters Patent of the United States is :—

1. A jacking system for permanent attachment to a vehicle comprising a pump having a pump body and pump means including a pump spindle in the pump body, a source of fluid supply connected to the intake side of said pump, hydraulically operated lifting jacks, pipe communications between the jacks and the delivery side of the pump, a release valve mounted within the pump body and adapted to release the fluid pressure supplied to the jacks, an electric motor for driving the pump and fixed to the pump coaxially with said spindle so that the pump body has a substantially continuous appearance with respect to the motor casing, a make and break device in the motor circuit and carried by the pump body, a movable member mounted in the pump body and connected to the release valve and to the make and break device, and a device for transferring manual force exerted by the driver to the said movable member so as simultaneously to close the valve and the make and break device, whereby the pumping means is driven and fluid pressure supplied to at least one of the jacks.

2. A jacking system for permanent attachment to a motor vehicle comprising a pump having a pump body and pump means in the pump body, a source of fluid supply connected to the intake side of said pump, hydraulically operated lifting jacks, pipe communications between the jacks and the delivery side of the pump, a release valve mounted within the pump body and adapted for releasing the fluid pressure supplied to the jacks, a clutch mounted adjacent to the pump body, an electric motor for driving the pump, a make and break device in the motor circuit and carried by the pump body, a movable member mounted in the pump body and connected to the release valve and to one of the clutch elements, a device leading from the movable member to a position adjacent to the driver and operable to transmit movement applied by the driver to the movable member so as to close the valve and the make and break device to drive the pumping means and supply fluid pressure to at least one of the jacks, and means within the pump body whereby the supply of fluid to the jacks ceases when a predetermined pressure is reached.

3. A jacking system for permanent attachment to a motor vehicle comprising a pump having a pump body and having pump means and a pump spindle in the pump body, a source of fluid supply connected to the intake side of said pump, hydraulically operated lifting jacks, pipe communications between the jacks and the delivery side of the pump, a release valve mounted within the pump body and adapted for releasing the fluid pressure supplied to the jacks, an electric motor for driving the pump, a circuit for said motor, said circuit including a make and break device operable under control of the operator to close both the valve and the make and break device, whereby the pumping means is driven and fluid pressure supplied to at least one of the jacks, and means within the pump body whereby the supply of fluid to the jacks ceases when a predetermined pressure is reached.

DONALD WILFRED SESSIONS.